(12) United States Patent
Yadav

(10) Patent No.: US 9,350,595 B1
(45) Date of Patent: May 24, 2016

(54) SYSTEM AND METHOD FOR SERIALIZING AND DESERIALIZING DATA OBJECTS INTO A SINGLE BINARY STREAM

(75) Inventor: Sunil Yadav, Bangalore (IN)

(73) Assignee: EMC Corporation, Hopkinton, MA (US)

( * ) Notice: Subject to any disclaimer, the term of this patent is extended or adjusted under 35 U.S.C. 154(b) by 678 days.

(21) Appl. No.: 11/965,254

(22) Filed: Dec. 27, 2007

(51) Int. Cl.
*G06F 15/16* (2006.01)
*H04L 29/06* (2006.01)
*H04L 29/08* (2006.01)

(52) U.S. Cl.
CPC .... *H04L 29/06462* (2013.01); *H04L 29/06027* (2013.01); *H04L 29/08072* (2013.01)

(58) Field of Classification Search
USPC .......................................................... 709/231
See application file for complete search history.

(56) References Cited

U.S. PATENT DOCUMENTS

| | | | | |
|---|---|---|---|---|
| 5,630,050 | A * | 5/1997 | Neuhard et al. ................. | 714/27 |
| 6,035,303 | A * | 3/2000 | Baer et al. ................. | 707/103 R |
| 2005/0166140 | A1 * | 7/2005 | Cai et al. ........................ | 715/513 |
| 2005/0240943 | A1 * | 10/2005 | Smith et al. .................... | 719/328 |
| 2006/0190469 | A1 * | 8/2006 | Kathuria et al. ............... | 707/101 |
| 2007/0061704 | A1 * | 3/2007 | Simova et al. ................. | 715/512 |
| 2008/0298591 | A1 * | 12/2008 | Bradley et al. ................ | 380/277 |
| 2013/0007698 | A1 * | 1/2013 | Warila et al. ................... | 717/106 |

* cited by examiner

*Primary Examiner* — Chris Parry
*Assistant Examiner* — Alan S Chou
(74) *Attorney, Agent, or Firm* — Dergosits & Noah LLP; Todd A. Noah

(57) ABSTRACT

The present invention is a system and method for optimizing the storage and transmission of a data object. Specifically, the present invention improves current data object serialization and deserialization methods involving multiple data objects. Current serialization techniques provide for serialization and deserialization using a single data object per transmission, or stream. As such, data objects may be serialized, then streamed to a destination one data object at a time. Unfortunately, present serialization and deserialization techniques require that each object must be streamed on its own binary stream, so many streams may be simultaneously transmitting. This places a toll on the transmission pipeline, and results in an "out of memory" response from the associated software application. The present invention provides a system and method for enabling multiple data objects to be transmitted on a single binary stream, improving the efficiency of the software applications associated with the distributed collaboration environment.

20 Claims, 2 Drawing Sheets

SYSTEM AND METHOD FOR SERIALIZING AND DESERIALIZING DATA OBJECTS INTO A SINGLE BINARY STREAM

TECHNICAL FIELD

The present invention relates generally to data object backup and recovery, and specifically, to a system and method for improving the serialization and deserialization of data objects during transmission.

BACKGROUND OF THE INVENTION

Data object creation, management and access are currently moving from a single computer model to a distributed network model. Instead of limiting data objects to a single client computer, organizations and users are adopting a collaborative structure, where multiple users can work on multiple data objects from multiple locations. Data objects may be stored in one or more locations, and users can interact with those data objects using a web-based browser or other user interface. Using a single network interface, or portal, for data objects may help track which data object is the most recent version, while at the same time unifying user-data object interaction to a single virtual location.

Distributed collaboration is also seen as a way to achieve platform independence, since data objects created and accessed using this model may not depend upon a single computing platform or operating system. As a result, there are a number of different types of data objects now being created and used in the distributed collaboration setting, such as those generated from online web applications. The most common distributed collaboration setting is the web-based application model, but other intranet and networked models are available as well. One such networked model is Microsoft SharePoint® Services. Web applications like Microsoft SharePoint Services offer a network-based document management platform accessible through an interne or intranet portal.

As web applications become more popular, it is important that the transmission and storage of web application data objects remains efficient. Non-web based software applications designed to work with traditional client-based or client-server based models should function equally well in the distributed collaboration environment. For example, data backup is just as crucial for web-based data objects as it is for client computer-based data objects. Present data backup software applications need to be able to handle the different types of data objects used in the web-based environment. To this end, some backup software applications, such as EMC Software's Backup Manager for SharePoint, monitor, manage and maintain backups of the data objects accessed in the distributed collaboration environment. The efficiency of these applications is directly related to their ability to pass large amounts of data objects from one software module to another module, or one software application to another, regardless of whether the transmission is over a directly connected computer or a network.

An issue with current distributed collaboration systems is that the volume of data objects can overload the memory resources of the software applications involved. The reason may be that data objects are be kept in temporary memory for longer periods of time, or that software applications have not been properly configured to handle web application data objects. This may also be due to the fact that in a distributed collaboration environment, users may be working on many different types of data objects. For example, in an online office productivity suite, users may be collaborating on a number of word processor, spreadsheet, presentation and scheduling data objects, all at the same time. As each web application transmits and accesses each data object, this can overload their collective memory resources.

In order to efficiently distribute and manage such data objects, efforts have been made to streamline their transmission and storage. One such effort applies the method of serialization. One skilled in the art will appreciate that serializing is a way to simplify a data object by converting it into a string of data, then transmitting or "streaming" it to another application or storing it to disk. In other words, serializing a data object will "flatten" it into a more basic format for transmission to a destination. After the serialized data object arrives at the destination, it will be "unflattened" or deserialized back to its original form. One will appreciate that there are many serialization and deserialization techniques, including converting to binary or text-readable formats. Serializing a data object to a binary stream may speed transmission and enable higher volumes of transfer, since the data object has been converted to a more streamlined data structure comprised of ones and zeros rather than kept in its original format.

Current serialization techniques provide for serialization and deserialization using a single data object per stream. As such, data objects may be serialized, then streamed to a destination one data object at a time. For example, five data objects may be serialized into five flattened objects, which are then transmitted using five separate data streams. While serialization does lessen the impact on memory resources at the point where the data object is flattened, serialization by itself does not improve transmission time or load. Present distributed collaboration environments, as well as many distributed computing environments, involve interaction with multiple data objects. Unfortunately, present serialization and deserialization techniques require that each object must be transmitted using its own binary stream, so multiple streams may be simultaneously transmitting. In other words, a hundred serialized data objects will require a hundred data streams. This places a toll on the transmission pipeline, and results in an "out of memory" response from the associated software application.

What is therefore needed is an improved way to stream serialized data objects. What is further needed is a way to improve web application and web application system performance by reducing memory requirements.

BRIEF DESCRIPTION OF THE FIGURES

The present invention is illustrated by way of example and not limitation in the figures of the accompanying drawings, in which like references indicate similar elements, and in which.

DETAILED DESCRIPTION OF THE INVENTION

Figure 1:
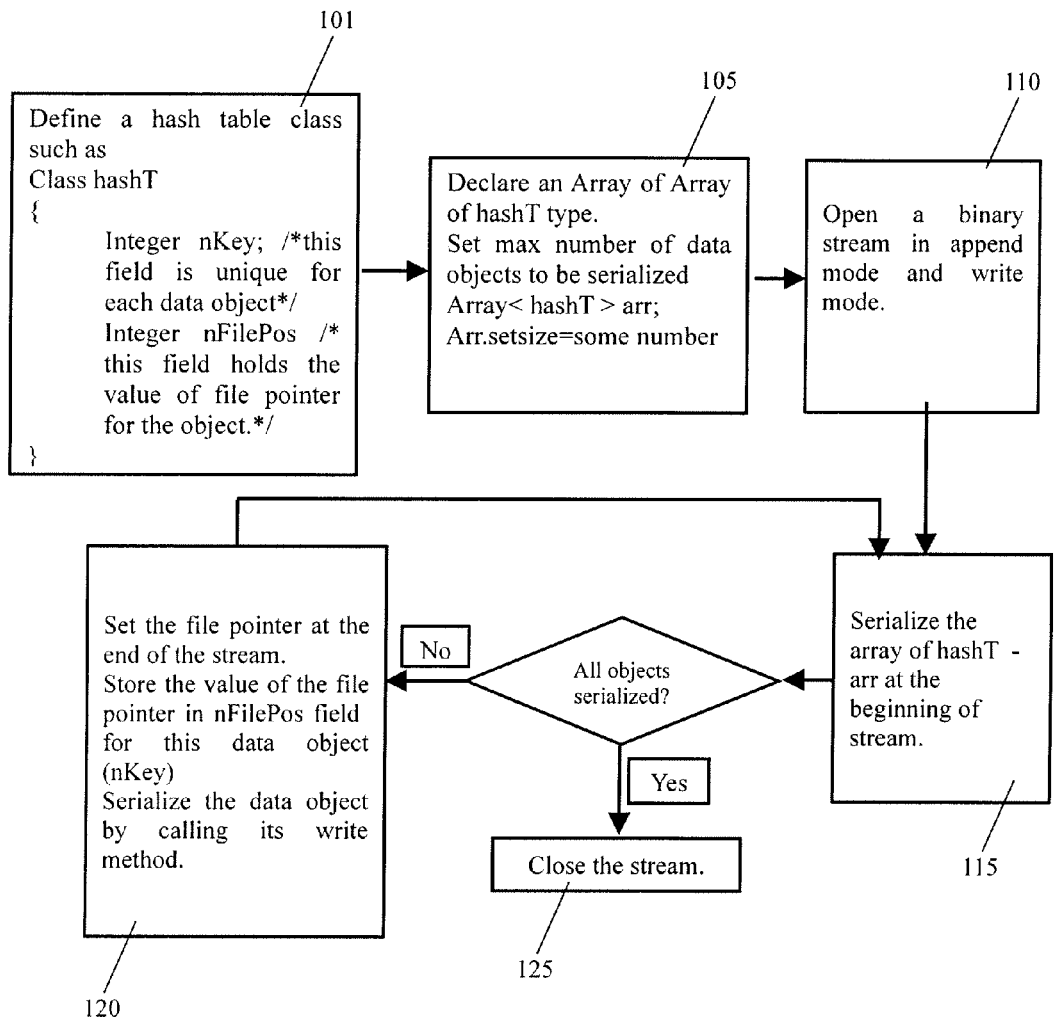
FIG. 1 is an exemplary flow diagram illustrating the steps of serialization according to an embodiment of the present invention.

The present invention is a system and method for optimizing the storage and transmission of a data object. Specifically, the present invention improves current data object serialization and deserialization methods involving multiple data objects. Instead of requiring multiple data streams for multiple serialized data objects, the present invention provides a software-enabled method for transmitting multiple data objects in a single binary stream. The present invention therefore reduces the load on the transmission portion of the distributed collaboration environment. In addition, because the present invention reduces the memory footprint of the data objects, it optimizes the overall load on the distributed collaboration environment and improves the efficiency of the software applications associated with the distributed collaboration environment. An added benefit is that the present invention will not interfere with the user's access to the data objects. While the disclosure herein describes use of the present invention with binary file formats, one will appreciate that other formats may be used without departing from this disclosure or the spirit of the present invention.

The following description illustrates an embodiment of the present invention in the context of a distributed collaboration environment, such as a web-based application server or workspace. One will appreciate, however, that aspects of the present invention may apply equally to other environments where efficient data transfer is beneficial and desirable. For example, the present invention may be especially useful to other software applications that interact with large distributed databases. This may include web-based or non-web based applications. Typically, such software applications cannot accommodate all necessary data objects in its RAM memory. As will be explained below, the present invention may provide a way to selectively serialize and deserialize necessary data objects into a single binary stream, thereby optimizing the use of RAM memory. Because related data objects may be serialized to reduce memory load, and selectively deserialized when needed, the present invention will reduce the impact on RAM memory resources. This may be an improvement over current streaming methods that stream multiple data objects in multiple binary streams, since multiple binary streams will require more memory than the single binary stream of the present invention. One will appreciate that the management of multiple binary streams may tax the performance of the particular software application.

It should be appreciated that the present invention can be implemented in numerous ways, including as a process, an apparatus, a system, a device, a method, or a computer readable medium such as a computer readable storage medium comprising computer program instructions or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

Currently, there are many available methods for serializing data objects to multiple data streams. Many such methods are inherently built into the programming language, especially object-oriented programming languages. For example, in the Java programming language, serialization may be executed by marking an object for serialization and implementing the "java.io.Serializable" interface. One will appreciate that this will mark the object as "okay to serialize." The Java programming language will automate the serialization of the object once marked. Once a user or application marks a data object for serialization, the data object will automatically be serialized and available for transmission to requested destination or stored for future use. One will appreciate that deserialization will also be provided by the programming code. As such, a serialized data object may be automatically deserialized simply by issuing the proper command. This automated serialization and deserialization capability is not unique to Java. One will appreciate that similar or equivalent serialization and deserialization commands are available in the .NET programming language, as well as other programming languages such as C++. Nevertheless, as noted previously, once data objects are serialized using current methods, they may only be transmitted on individual data streams.

In the present invention, because multiple data objects may be streamed in a single binary stream, additional steps may be necessary to enable the present invention. These steps may use the programming languages mentioned above, without solely relying upon their inherent automated serialization and deserialization commands. These steps are also designed to be performed in any programming language.

In an embodiment, performing the steps of the present invention may require identifying data objects for serialization and identifying the method of serialization. As shown in FIG. 1, one may begin by identifying the serialization method to be used, the number of objects to be serialized, and the specific data objects to serialize. This may be done by using a hash table or similar data structure. The format of the data structure may vary, so long as the necessary information is included. For example, in step 101 of FIG. 1, the user or the software application may define a hash table class and array class type, as well as the maximum number of objects to be serialized (step 105 of FIG. 1). One will appreciate that a hash table is a searchable data structure that facilitates "lookup" by defining certain fields, such as a "key" and a "value" for that key. Given a key, one may find a corresponding value.

In an embodiment, the hash table may have two fields: a hash key field that uniquely distinguishes each object ("identifier"), and a second field containing a file pointer value or other such identifier for identifying the data object's position in the stream ("location"). In other words, the hash table class fields may include a field for identifying the data object, and a field for identifying the position or location of the data object in the binary stream. One may define the hash key field using the "Integer nKey" command, and the file pointer value using the "Integer nFilePos" command. As discussed below, these fields may be used to retrieve this object for deserialization. One will appreciate that these commands are merely exemplary and are not intended to limit this disclosure in any way.

Setting the maximum number of data objects for serialization will help determine the memory resources required to store and/or transmit the serialized data objects once written to the single binary stream format. This is illustrated in step 105 of FIG. 1, using exemplary command "Arr.setsize". One will appreciate that other commands may be used to define this parameter, so long as the number of data objects is specified.

After all the above parameters are defined, then in step 110 of FIG. 1 the user or software application opens or creates a binary stream. This may place the software application in a "ready" mode to accept and transmit data objects once the single binary stream is created. One will appreciate that the "ready" mode may also be termed "append and write mode." The data objects chosen for serialization may then be serialized. In step 115, the binary stream is created by first encoding the previously-created hash table. In an embodiment, this hash table or other such data structure will precede the serialized data objects themselves. This may be stored as a header in the data stream. The data structure will help ensure that once the stream reaches the destination, the software application tasked with deserialization will be able to initially identify the data objects contained in the stream. After this is performed, in step 120 a data object chosen for serialization may then be serialized using the previously defined technique. The file pointer value used to identify the location of data object will be appended to the serialized object. The structure will, therefore, keep track of the identity of the serialized object, while also ensuring the location of the serialized data object is recorded in the data structure.

Alternatively, the data structure may be updated with the serialized data object's location once it is written to the stream. If a hash key is being applied, then once the data object is serialized to stream, the file pointer value for the object is recorded or added the hash table using the hash key. These steps may then be repeated for each data object to be serialized. Once all data objects have been serialized and their identifier information and location information has been added to the initial data structure, then in step 125 the stream may be closed and transmitted to another destination. Alternatively, the stream may be created and stored for future use or transmission. One will appreciate that these steps may be varied or altered without departing from the scope of the present invention.

Figure 2:
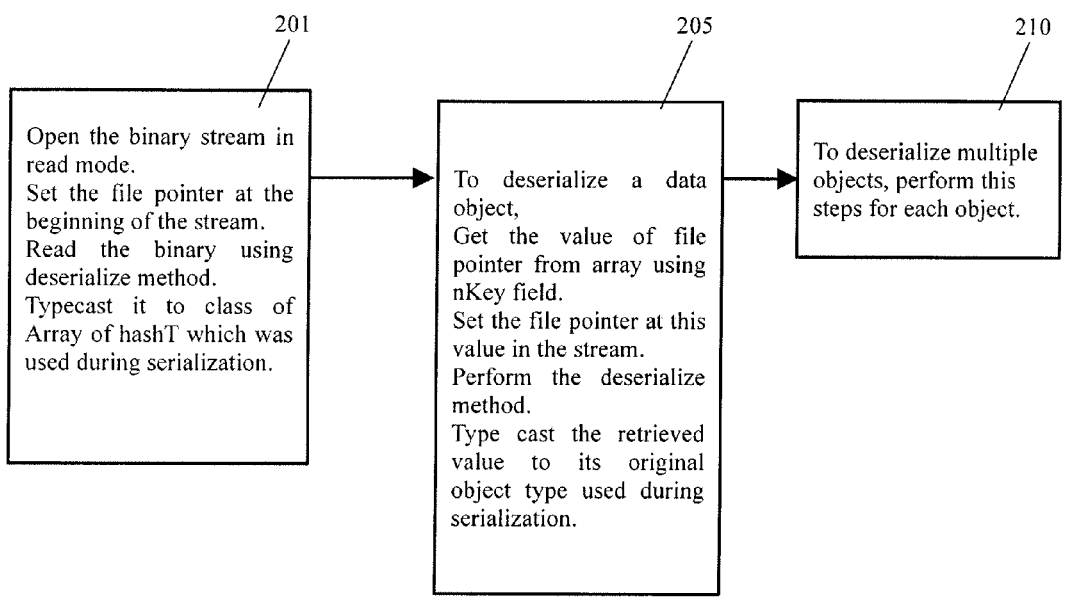
FIG. 2 is an exemplary flow diagram illustrating the steps of deserialization according to an embodiment of the present invention.

A serialized data object may not be useful or usable unless it is returned to its original form, or deserialized. The deserialization aspect of the present invention may involve the following steps. As shown in FIG. 2, a first step 201 may be to open up the binary stream and to read the initial data structure at the beginning of the stream. The data structure may be stored in or as a header. As noted previously, this initial data structure, which may be a hash table, will contain an identification of the data objects contained in the stream, their location, and their method of serialization. If the serialization method described above is used, then the same hash key may be used to uncover the hash values that define each object's location in the stream. Once this information is obtained, then in step 205 the desired data object may be located and deserialized. These steps of reading, locating and deserializing may be performed for each data object to be serialized (step 210). One will appreciate that all of the serialized data objects need not be deserialized at the same time. The present invention will allow a software application to selectively deserialize only those data objects needed at a certain time. This may keep memory resources open since unnecessary data objects will remain serialized, and will therefore not utilize as much memory space. Selective deserialization is possible because each serialized data object is compartmentalized within the stream and locatable using the data structure or hash table at the beginning of the stream.

In short, the present invention provides a way to serialize and deserialize data objects to a single binary stream. The present invention makes no distinction about the type or format of the data object prior to serialization or after serialization. Because the same technique may be used for any type of data object, the present invention improves the transmission and storage of data objects across a distributed collaboration system or a distributed computing system. One will appreciate that aspects of the present invention may be applied to directly connected computing systems as well.

The description above is set forth in order to provide a thorough understanding of the present invention. It will be evident to one of ordinary skill in the art that the present invention may be practiced without these specific details. In other instances, well-known structures and devices are shown in block diagram form to facilitate explanation. The description of the preferred embodiments is not intended to limit the scope of the claims appended hereto. For example, the present invention is described in the context of web applications and some non-web based software applications that interact with distributed databases. One will appreciate that the present invention may also be applied to software applications that require data caching mechanisms. Because data objects may be serialized into a single binary stream and deserialized selectively, multiple data objects may be kept in temporary or permanent or persistent memory, and may be deserialized upon command for those types of software applications. As a result, disk caching is optimized by aspects of the present invention as well.

What is claimed is:

1. A method for creating a data stream of serialized data objects comprising:
   storing, by a computer having memory, a data structure containing a plurality of identifiers, wherein each identifier of the plurality of identifiers identifies a data object of a plurality of data objects;
   setting, by the computer, a maximum number of data objects for serialization within a single data stream;
   serializing, by the computer, the plurality of data objects based on the set maximum number of data objects for serialization;
   creating, by the computer, the single data stream that includes both the data structure, as a header in the data stream, and the plurality of serialized data objects; and
   writing, to the data structure, the location of each of the plurality of serialized data objects in the single data stream, the location of one of the plurality of serialized data objects in the data stream being used to deserialize the one of the plurality of serialized data objects in the data stream.

2. The method of claim 1, further comprising transmitting the data stream.

3. The method of claim 1, further comprising:
   selecting one of the plurality of serialized data objects for deserialization; and
   deserializing the selected data object.

4. The method of claim 1, wherein the plurality of identifiers are stored as hash keys.

5. The method of claim 4, wherein the location of each of the plurality of serialized data objects in the data stream is stored as a file pointer value.

6. The method of claim 5, wherein and the data structure is a hash table.

7. The method of claim 1, wherein the data stream is a single binary stream.

8. The method of claim 1 wherein the instructions to create a data stream comprises instructions to:
   open the data stream;
   serialize a first data object of the plurality of data objects to the data stream;
   serialize a second data object of the plurality of data objects to the data stream; and
   close the data stream after the serializing the first data object and second data object to the data stream.

9. A method of serializing and deserializing data comprising:
   storing, by a computer having memory, a data structure containing a plurality of identifiers, wherein each identifier of the plurality of identifiers identifies a data object of a plurality of data objects;
   setting, by the computer, a maximum number of data objects for serialization within a single data stream;
   serializing, by the computer, the plurality of data objects based on the set maximum number of data objects for serialization;
   creating, by the computer, the single data stream that includes both the data structure, as a header in the data stream, and the plurality of serialized data objects;

writing, to the data structure, the location of each of the plurality of serialized data objects in the single data stream;

selecting one of the plurality of serialized data objects for deserialization; and deserializing the selected data object using the location of the selected data object written to the data structure to locate the selected data object within the single data stream.

10. The method of claim 9, wherein the plurality of identifiers are stored as hash keys.

11. The method of claim 10, wherein the location of each of the plurality of serialized data objects in the data stream is stored as a file pointer value.

12. The method of claim 11, wherein the data structure is a hash table.

13. The method of claim 9, wherein the data stream is a single binary stream.

14. A computer program product, comprising a non-transitory computer usable medium having a computer readable program code embodied therein, the computer readable program code adapted to be executed by one or more processors, the program code including instructions to:

store, by a computer having memory, a data structure containing a plurality of identifiers, wherein each identifier of the plurality of identifiers identifies a data object of a plurality of data objects selected for serialization within a single data stream;

set, by the computer, a maximum number of data objects for serialization;

serialize, by the computer, the plurality of data objects based on the set maximum number of data objects for serialization;

create, by the computer, the single data stream that includes both the data structure, as a header in the data stream, and the plurality of serialized data objects; and write, to the data structure, the location of each of the plurality of serialized data objects in the single data stream, the location of one of the plurality of serialized data objects in the data stream being used to deserialize the one of the plurality of serialized data objects in the data stream.

15. The computer program product of claim 14, the program code comprising further instructions to:

transmit the data stream.

16. The computer program product of claim 15, the program code comprising further instructions to:

select one of the plurality of serialized data objects for deserialization; and deserialize the selected data object.

17. The computer program product of claim 14, wherein the plurality of identifiers are stored as hash keys.

18. The computer program product of claim 17, wherein the location of each of the plurality of serialized data objects in the data stream is stored as a file pointer value.

19. The computer program product of claim 18, wherein the data structure is a hash table.

20. The computer program product of claim 18, wherein the data stream is a single binary stream.

\* \* \* \* \*